UNITED STATES PATENT OFFICE.

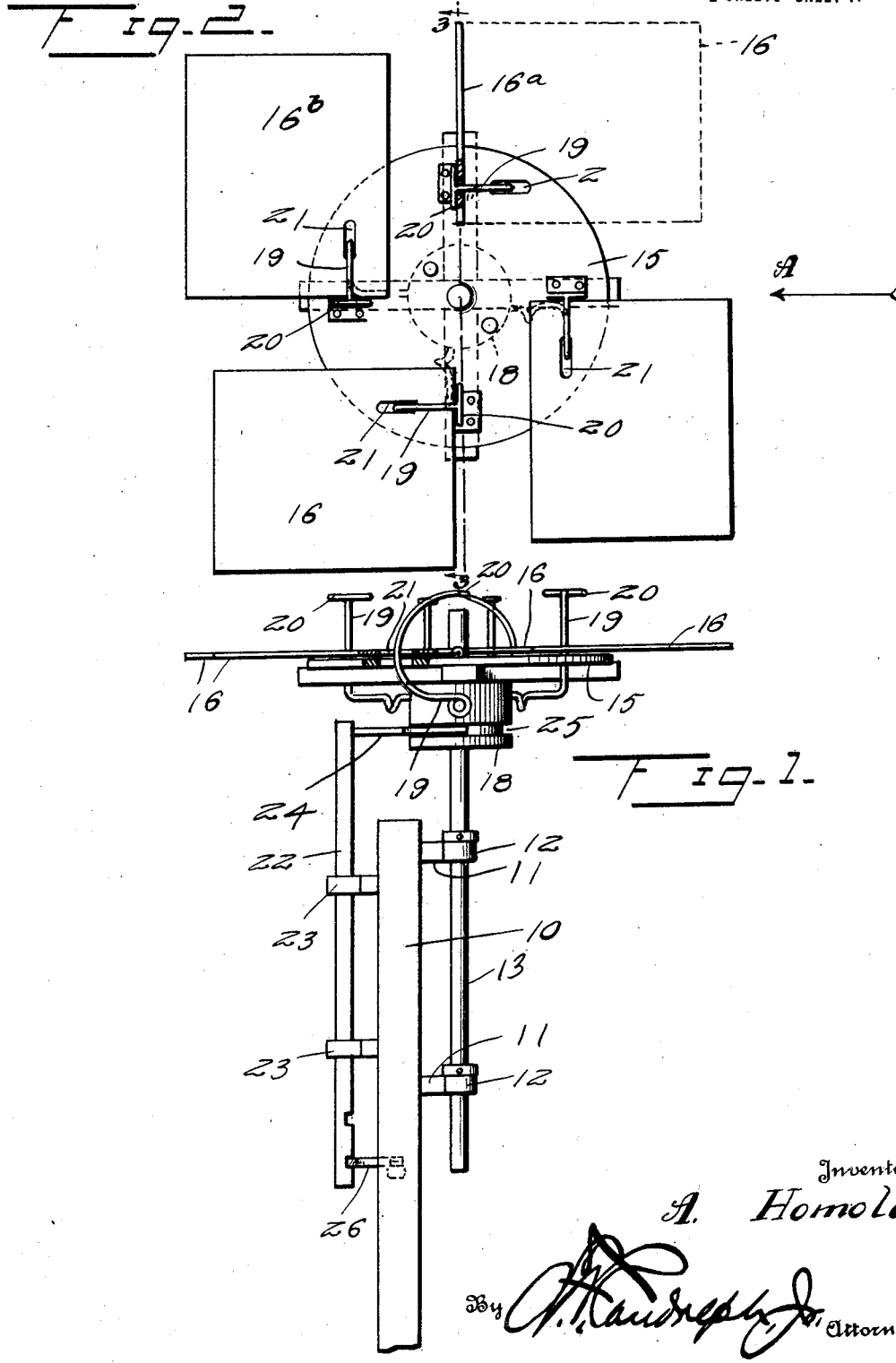

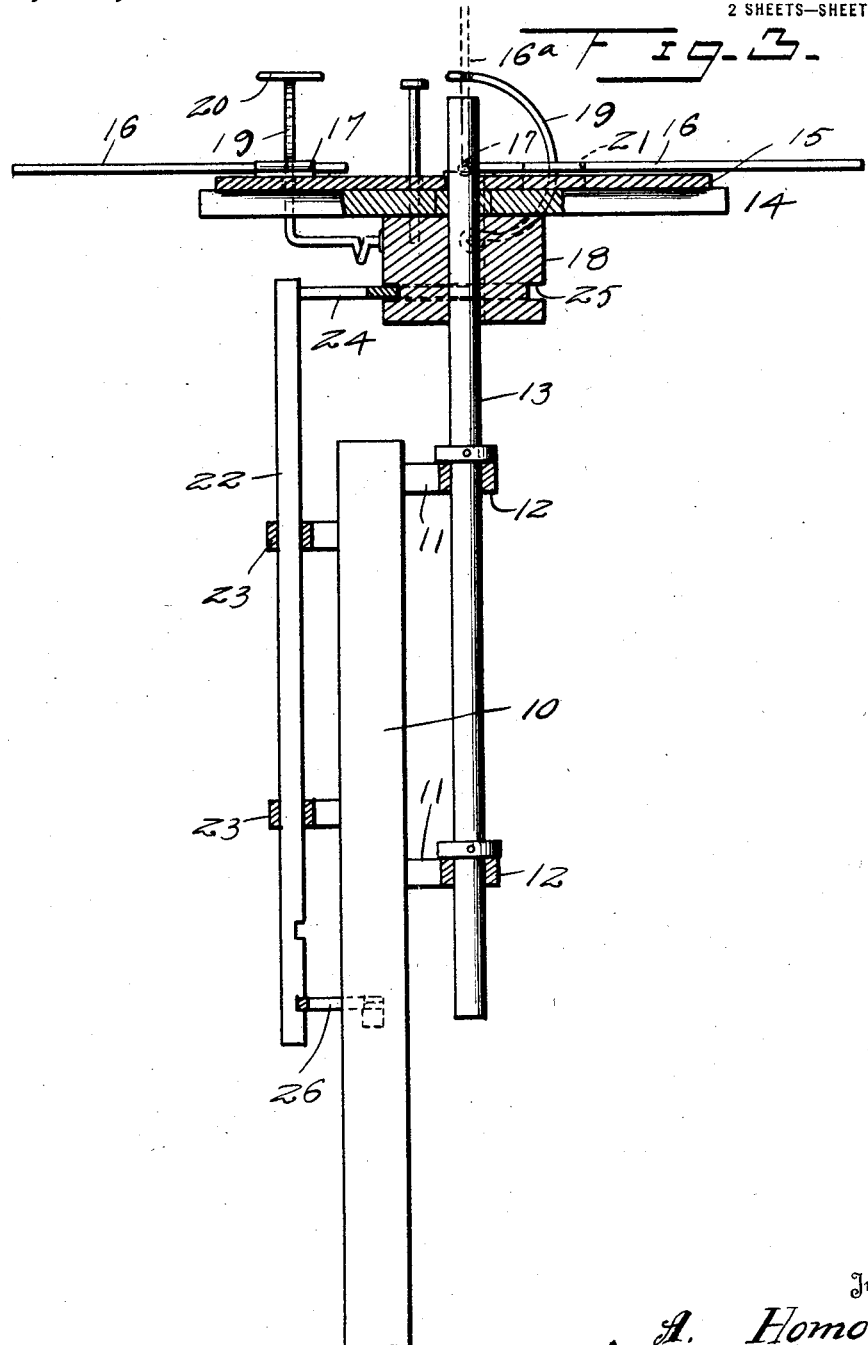

ABRAHAM HOMOLA, OF FARGO, NORTH DAKOTA.

HORIZONTAL WINDMILL.

1,411,097.     Specification of Letters Patent.     Patented Mar. 28, 1922.

Application filed July 11, 1921. Serial No. 483,836.

*To all whom it may concern:*

Be it known that I, ABRAHAM HOMOLA, a citizen of the United States, residing at Fargo, in the county of Cass and State of North Dakota, have invented certain new and useful Improvements in a Horizontal Windmill; and I do hereby declare the following to be a full, clear, and exact description of the invention, such as will enable others skilled in the art to which it appertains to make and use the same.

The object of the invention is to provide a simple, inexpensive and efficient windmill of the horizontal type wherein the maximum effect of the wind is utilized under conditions minimizing the possibility of damage to the mill in the event that the wind is uncertain or changes direction abruptly; and with this object in view the invention consists in a construction and combination of parts of which a preferred embodiment is shown in the drawing, wherein:

Figure 1 is a side view of a windmill embodying the invention.

Figure 2 is a plan view thereof.

Figure 3 is a vertical sectional view on the plane indicated by the line 3—3 of Figure 2.

The tower 10, which may be of any suitable construction and may be of much less height than that required in the ordinary windmill structure wherein the axis of movement is horizontal, is provided with the lateral arms 11 having bearings 12 for the power or windmill shaft 13 which carries the wheel indicated generally at 14 and comprising essentially the disk 15 and the hinged wings 16.

The wings as illustrated may be of substantially rectangular form hinged as at 17 to the disk or body of the wheel on radial lines and adapted when extended as shown at $16^a$ in Figure 2 to occupy an upright, substantially vertical position on a radial plane directly opposed to the path of movement of the wind which is indicated by the arrow A in Figure 2, and obviously when the wing $16^a$ is receiving the full force of the pressure of the air, the wing immediately preceding the same and which has previously been exposed to the pressure of the wind and which is indicated in Figure 2 at $16^b$ is completely shielded by the wing $16^a$ so that it is free to fold downward into a horizontal position parallel and substantially in contact with the disk 15, so that in subsequently moving forward against the direction of the wind it offers substantially no obstacle or resistance to the turning movement of the wheel. For this reason the maximum efficiency of the wind with relation to the area of blade exposed is secured and a change abruptly or otherwise in the direction of the wind will not affect the operation of the device inasmuch as it can only serve to raise other wings and permit the folding of those which have been relieved of pressure.

Mounted upon the power shaft below the plane of the disk or body portion of the wheel is a block 18 from which project retaining fingers 19 extending upward through the disk of the wheel and provided with terminal heads 20, said retaining fingers or arms being of curved or arcutate form and being more or less flexible and extending through slots 21 in the blades, so that when the block 18 is lowered the fingers will cause the folding of the wings when it is desired to stop the rotary movement of the wheel. It will be obvious that the block turns with the shaft of the wheel and in order to operate the same to fold the wings or blades, there is employed a shifting bar 22 in suitable guides 23 supported by the tower 10 and having at its upper end a yoke 24 which engages an annular groove 25 in the block. The shifting bar extends to a point within convenient reach of the ground and a suitable locking device 26 is provided to secure the same in its elevated position when the windmill is desired to operate.

Having thus described the invention, what I claim is:—

1. A windmill having a horizontal wheel consisting of a disk upon which are mounted folding wings or blades with their hinged edges disposed radially of the disk, said wheel being carried by the power transmitting shaft, and means for effecting the folding of said wings or blades, consisting of a member mounted for movement toward and from the plane of the wheel and arcuate fingers attached to said member and extending respectively through the blades or wings and provided with terminal heads for engaging the same.

2. A windmill having a horizonal wheel consisting of a disk upon which are mounted folding wings or blades with their hinged edges disposed radially of the disk, said wheel being carried by the power transmitting shaft, and means for effecting the folding of said wings or blades, consisting of a block slidingly mounted upon the wheel supporting shaft, arcuate yielding fingers carried by said block and extending through slots in the blades or wings respectively and provided with terminal heads, and means for positioning said block.

3. A windmill having a horizontal wheel consisting of a disk upon which are mounted folding wings or blades with their hinged edges disposed radially of the disk, said wheel being carried by the power transmitting shaft, and means for effecting the folding of said wings or blades, consisting of a block slidingly mounted upon the wheel supporting shaft, arcuate yielding finger carried by said block and extending through slots in the blades or wings respectively and provided with terminal heads, and means for positioning said block, consisting of a shifting bar mounted in suitable guides on the windmill tower and provided with a yoke for engaging the groove in said block.

In testimony whereof I affix my signature in presence of two witnesses.

ABRAHAM HOMOLA.

Witnesses:
  ARNOLD GUNNUFRAN,
  ANDRES OLSON.